United States Patent [19]

Schloffel

[11] 4,138,332
[45] Feb. 6, 1979

[54] METHOD AND DEVICE FOR DEWATERING SOLID SUSPENSIONS

[76] Inventor: Paul Schlöffel, Prof.-Dillinger-Weg 19, Bad Dürkheim, Fed. Rep. of Germany, 6702

[21] Appl. No.: 815,764

[22] Filed: Jul. 14, 1977

[30] Foreign Application Priority Data

Jul. 26, 1976 [DE] Fed. Rep. of Germany ....... 2633477

[51] Int. Cl.² .................. B01D 43/00; B04B 13/00
[52] U.S. Cl. .................. 210/73 R; 210/78; 210/101; 233/24
[58] Field of Search ............... 210/96 R, 101, 137, 210/65, 380, 512 R, 512 M; 209/489, 491, 496; 137/4, 92

[56] References Cited

U.S. PATENT DOCUMENTS

| | | | |
|---|---|---|---|
| 2,164,019 | 6/1939 | Perry | 210/101 |
| 2,648,433 | 8/1953 | Wright et al. | 210/512 R |
| 3,070,291 | 12/1962 | Bergey | 210/101 |
| 3,136,722 | 6/1964 | Gooch | 210/380 |
| 3,463,316 | 8/1969 | Fierstine | 210/96 |

Primary Examiner—William A. Cuchlinski, Jr.
Assistant Examiner—Jon E. Hokanson
Attorney, Agent, or Firm—Herbert L. Lerner

[57] ABSTRACT

Dewatering solid suspensions such as gypsum semihydrate in water of varying concentrations down to a low residual moisture by flowing the suspension into a hydrocyclone to partially dewater the suspension and then to a pusher centrifuge to produce solids of low residual moisture and controlling the volume inflow to the hydrocyclone to maintain, despite variations in concentrations of solids in the feed, a constant amount of solids per unit time. Variations in power consumption of the pusher centrifuge or specific gravity of the suspension before it enters the pusher centrifuge may be used to determine changes in volume inflow to maintain a constant solids content per unit time entering the hydrocyclone. Reduction of the solids to a uniform and low residual moisture content and avoidance of operating difficulties such as clogging or inadequate separation of the water results.

11 Claims, 1 Drawing Figure

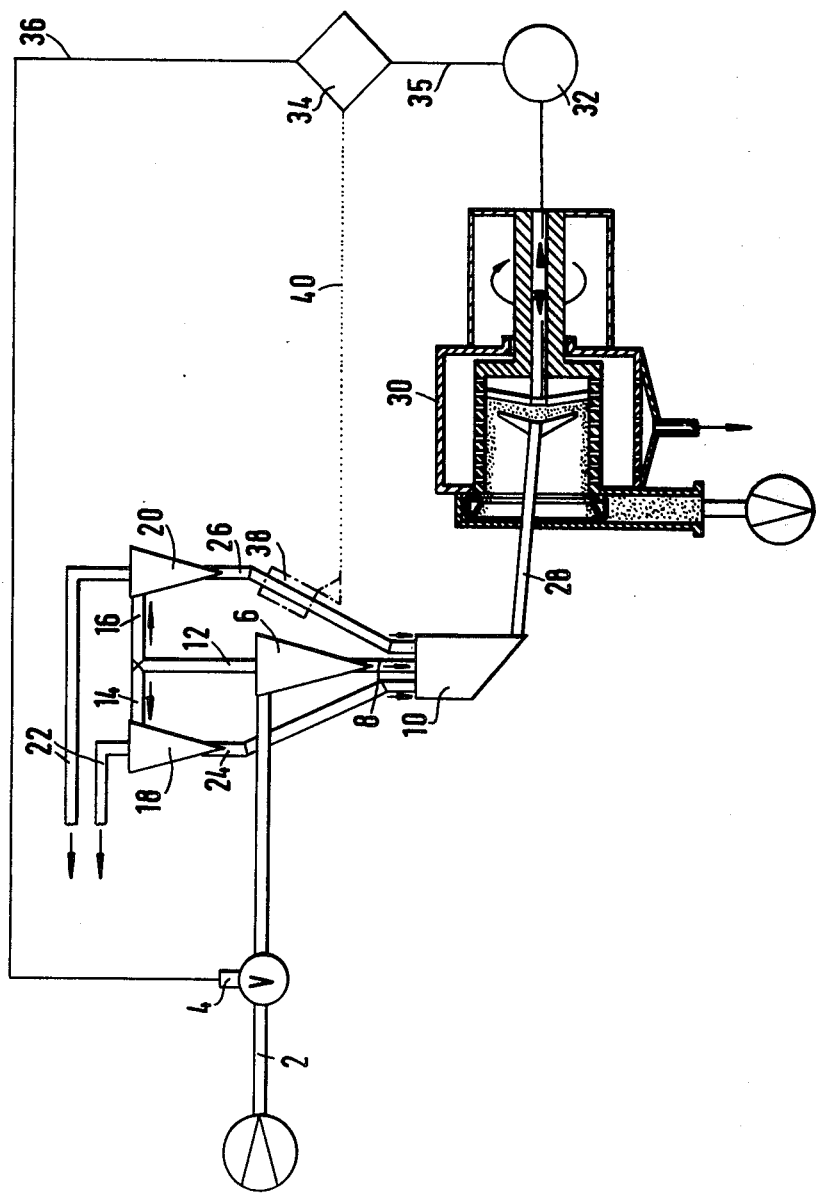

METHOD AND DEVICE FOR DEWATERING SOLID SUSPENSIONS

BACKGROUND OF THE INVENTION

1. Field of the Invention

The invention relates to thickening solid suspensions and more particularly refers to a new and improved method and apparatus for dewatering solid suspensions of varying concentration down to a low residual moisture by means of pusher centrifuge which has disposed ahead of it at least one hydrocyclone or at least one group of hydrocyclones.

2. Description of the Prior Art

Hydrocyclones and pusher centrifuges are known for use in dewatering. In dewatering solid suspensions by means of an arrangement consisting of hydrocyclones and a pusher centrifuge, problems arise if a low residual moisture is to be obtained under conditions in which the concentration of the suspension varies. If the conditions are set to produce a solid with a certain residual moisture not in excess of, say 3% (i.e., three percent by weight are crystal surface water), an increased concentration of solids in the fed-in suspension leads to disturbances of the operation. Increased solid concentration of the fed-in suspension may cause the lower outlet of a hydrocyclone to get clogged up. There is also the danger that the liquid leaving the upper outlet of the last hydrocyclone is still loaded with solids, i.e. is insufficiently purified. Also difficulties arise in consistently obtaining a uniform product with low water content.

SUMMARY OF THE INVENTION

An object of the invention is to provide a dewatering installation with a pusher centrifuge preceded by a hydrocyclone in such a manner to dewater solid suspensions down to extremely low residual moistures without the mentioned difficulties in operation.

With the foregoing and other objects in view, there is provided in accordance with the invention a method for dewatering solid suspensions of varying concentrations of solids down to a low residual moisture by first passing the solid suspension into at least one hydrocyclone to effect partial dewatering of the suspension and then passing the partially dewatered suspension into a pusher centrifuge to dewater the partially dewatered suspension to solids of low residual moisture, regulating the feed of varying concentrations of solids in accordance with the variation in concentration of solids to introduce into the hydrocyclone a constant amount of solids per unit time.

In accordance with the invention there is provided an apparatus for dewatering solid suspensions of varying concentrations down to a low residual moisture having a source of solid suspensions of varying concentrations of solids, a conduit for feeding the solid suspensions from the source to a hydrocyclone to effect partial dewatering of the suspension, transfer means for conveying the partially dewatered suspension into a pusher centrifuge to dewater the partially dewatered suspension to solids of low residual moisture, a control valve in the conduit for feeding the solid suspension from the source, a positioning unit for controlling the feed of the solid suspension in accordance with variations in concentration to maintain a constant amount of solids per unit time, and a control line connecting the positioning unit to the control valve regulated by the positioning unit.

Other features which are considered as characteristic for the invention are set forth in the appended claims.

Although the invention is illustrated and described herein as embodied in a method and device for dewatering solid suspensions, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing in which is diagrammatically illustrated an installation for carrying out the present invention.

DETAILED DESCRIPTION OF THE INVENTION

The amount of solids fed-in in the suspension fed to the hydrocyclone per unit time is kept constant by controlling the volume inflow to that hydrocyclone or that group of hydrocyclones which is arranged immediately ahead of the pusher centrifuge. If the density of the fed-in suspension increases, the volume inflow is throttled to such an extent that the amount of solids fed-in to the hydrocyclone per unit time remains constant. With a throughput throttled in this manner, the hydrocyclones receive only so much solid matter that clogging cannot occur and the water leaving via the upper outlet of the last hydrocyclone is completely clear. However, if the density of the suspension fed-in decreases again, then the volume inflow is increased, so that the same amount of solids is fed to the equipment per unit time and the latter can thicken the fed-in suspension to the desired constant concentration.

It has been found advantageous to measure the power consumption of the pusher centrifuge and to use it as the control input for the volume inflow. It is particularly simple, however, to measure the specific gravity of the suspension directly and to use it as the control input for the volume inflow. This measurement of the specific gravity is advantageously performed immediately ahead of the pusher centrifuge. Correction of deviations of solid content fed to the hydrocyclone will ordinarily take place in a matter of minutes or less and the quantity of solids fed per unit time of an hour or less remain substantially constant. A control valve which is connected via a control line to a positioning unit of conventional design is placed in the line which conducts the suspension to be concentrated. This positioning unit may be connected to a measuring device, for example, a wattmeter, which measures the power consumption of a motor driving the pusher centrifuge. It is advantageous, however, to connect the positioning unit to a conventional continuous-flow scale which measures the specific gravity of the suspension. This continuous-flow scale can be arranged either in the suspension feed-in line ahead of the hydrocyclones, or immediately behind the lower outlet of a hydrocyclone which is arranged immediately ahead of the pusher centrifuge, or else, between a mixing tank and the pusher centrifuge. Which of the three possibilities mentioned is chosen, depends on economic considerations. In general, the most economical and particularly effective control is obtained if the continuous-flow scale is arranged behind the lower outlet of a hydrocyclone which is placed immediately ahead of the pusher centrifuge.

The suspension to be concentrated is fed-in view the suspension feed line 2. A control valve 4 which controls the volume inflow through the suspension supply line 2 is inserted in line 2. The suspension fed from line 2 flows tangentially into a first hydrocyclone 6. The lower outlet 8 of hydrocyclone 6 leads into a mixing tank 10. The upper outlet 12 of the first hydrocyclone 6 is connected to the tangential inputs 14 and 16 of the two hydrocyclones 18 and 20 of a second group of hydrocyclones. The upper outlet discharge lines 22 of hydrocyclones 18 and 20 deliver substantially pure water. The lower outlet openings 24 and 26 of the two hydrocyclones 18 and 20 feed a concentrated suspension to the mixing tank 10. This concentrated suspension, however, is less concentrated than the suspension which runs off from the lower outlet 8 of the first hydrocyclone 6 into the mixing tank 10.

In the mixing tank 10, the concentrated suspensions of the first hydrocyclone group consisting here of a single hydrocyclone 6 and of the second hydrocyclone group consisting here of the hydrocyclones 18 and 20 as well as, if desired, additional hydrocyclone groups, are mixed and then fed to the pushed centrifuge 30 via the pusher centrifuge feed line 28.

The pusher centrifuge 30 is driven by a motor. The power consumption of the motor is measured by a measuring device 32 and fed to a positioning unit 34 as the control input. The positioning unit 34 is connected to the control valve 4 via the dashed control line 36 in order to regulate by means of the control valve 4, the volume inflow through the suspension feed line 2 as a function of the power consumption of the motor.

Dash-dotted lines forming a rectangle in the lower outlet discharge line 26 of the hydrocyclone 20 of the second hydrocyclone group designate a continuous-flow scale 38. Dotted line 40 connects continuous-flow scale 38 to the positioning unit 34; and when so connected the line 35 connecting the motor to the positioning unit 34 is omitted. The continuous-flow scale 38 measures the specific gravity of the suspension leaving the hydrocyclone 20 via the lower outlet 26. Information concerning changes in the specific gravity is fed via the line 40 to the positioning unit 34 and fed by the latter as a control input via the control line 36 to the control valve 4. To illustrate, assume that the suspension fed-in via the suspension feed line 2 has a water content of, say 90% by weight. Let the two hydrocyclones thicken this thin suspension to a residual moisture, the constant value of which is between 35 and 45% of residual moisture, say 40%. This residual moisture of 40% is the water content of the material in the mixing tank 10. The water content of the concentrated suspension flowing out through the lower outlet 8 of the first hydrocyclone 6 is lower, and the water content at the lower outlets 24 and 26 of the other two hydrocyclones 18 and 20 is higher. It is important to keep the concentration in the mixing tank 10 constant, in the present example at 40%, by controlling the volume inflow in the suspension feed line 2. This thickened suspension is then fed via the line 28 to the pusher centrifuge 30 which achieves a reduction of the residual moisture to, for instance, 3% by weight.

The problem of thickening solid suspension of varying concentration, occurs particularly in thickening chemical gypsum semihydrate. The latter is dewatered optimally in a pusher centrifuge if it is fed to the push centrifuge in a concentration of at least 1.1 kg solids per liter of suspension. The suspension drawn from the autoclave, the concentration of which varies between 0.3 and 0.6 kg of solids per liter of suspension, must therefore be pre-thickened at least to this constant numerical value of 1.1 kg of solids per liter of suspension. This is possible by means of the control method according to the invention. While heretofore it has been possible to dewater chemical gypsum semihydrate in the pusher centrifuge, preceded by hydrocyclones, only to a residual moisture of 8% by weight of water without difficulties in operation; by using the control method in accordance with the invention, this residual moisture can be reduced to 3%.

The positioning unit 34 is formed, for example, of a power meter which transmits power variation of a signal to the control valve 4. Such positioning units are well-known in control engineering.

The continuous flow scale 38 may be of the type manufactured by a subsidiary of Elliott-Automation Group of Germany, Austria and Switzerland, and more specifially of an Elliott density measuring device for continuously measuring a specific weight of a process flow, as described in a prospectus, published in 1975 and entitled Elliott-Dichtemessgarat Gravitrol ® Mark 4.

There are claimed:

1. In a method for dewatering a feed of solid suspensions of varying concentrations of solids in water down to a low residual moisture by first passing the solid suspension in water into at least one hydrocyclone to effect partial dewatering of the feed of solid suspension in water into a first component of water with a reduced amount of solid and a second component of partially dewatered solid suspension, and then passing the partially dewatered solid suspension into a pusher centrifuge to dewater the partially dewatered solid suspension to a third component of solids of low residual moisture and a fourth component of water separated from the third component of solids of low residual moisture, the improvement comprising regulating the feed of solid suspensions of varying concentrations of solids in accordance with the variation in concentration of solids in the feed of solid suspensions to introduce into the hydrocyclone a constant amount of solids per unit time.

2. Method according to claim 1, wherein the pusher centrifuge is driven by an electrical motor, and wherein electric power consumption of the pusher centrifuge which varies with changes in amounts of solids fed to the pusher centrifuge is measured and used as a control means for regulating the feed volume of solid suspension to the hydrocyclone to introduce into the hydrocyclone a constant amount of solids per unit time.

3. Method according to claim 1, wherein the specific gravity of the partially solid suspension which varies with varying concentrations of solids, is measured and used as a control means for the regulating feed volume of solid suspension to the hydrocyclone to introduce into the hydrocyclone a constant amount of solids per unit time.

4. Method according to claim 3, wherein the specific gravity of the partially solid suspension is measured immediately ahead of the pusher centrifuge.

5. Method according to claim 1, wherein the solid suspension is gypsum semihydrate in water.

6. In apparatus for dewatering solid suspensions of varying concentrations down to a low residual moisture having a feed source of solid suspensions of varying concentrations of solids in water, a conduit for feeding said feed solid suspensions in water from said source to a hydrocyclone wherein said entering feed of solid suspensions in water is separated into a first component of water with a reduced amount of solids and a second component of partially dewatered solid suspension, transfer means for conveying the partially dewatered suspension from the hydrocyclone into a pusher centrifuge wherein the partially dewatered solid suspension is dewatered to a third component of solids of low residual moisture and a fourth component of water separated from the third component of solids of low residual moisture, the improvement comprising a control valve in said conduit for feeding said feed of solid suspension of varying concentrations of solid in water from said source, a positioning unit for controlling said feed of solid suspension in water flowing from said source to said hydrocyclone in accordance with variations in concentration of solids in said feed to maintain a constant amount by weight of solids per unit time, and a control line connecting the positioning unit to the control valve regulated by the positioning unit, and a signal generating means giving a signal, dependent on the concentration of solids in the feed, connected to the positioning unit.

7. Apparatus according to claim 6, wherein the positioning unit is connected to a measuring device which measures the power consumption of a motor driving the pusher centrifuge and the feed of solid suspension in water flowing from said source to said hydrocyclone is varied with the a change in power consumption.

8. Apparatus according to claim 6, wherein the positioning unit is connected to a continuous-flow scale which measures changes in the specific gravity of the second component of partially dewatered solid suspension from the hydrocyclone, and the feed of solid suspension in water flowing from said source to said hydrocyclone is varied with changes in the specific gravity.

9. Apparatus according to claim 8, wherein the continuous-flow scale is disposed in the suspension feed line.

10. Apparatus according to claim 8, wherein the continuous-flow scale is disposed downstream of the flow of the second component of partially dewatered solid suspension through a lower outlet of the hydrocyclone and upstream of the pusher centrifuge.

11. Apparatus according to claim 8, wherein there are a plurality of hydrocyclones which are connected to a common mixing tank for flow of partially dewatered solid suspension from the hydrocyclones to the common mixing tank, and wherein the continuous-flow scale is disposed in the pusher centrifuge feed line between the mixing tank and the pusher centrifuge.

* * * * *